United States Patent [19]
Gill et al.

[11] Patent Number: 5,492,720
[45] Date of Patent: Feb. 20, 1996

[54] METHOD OF MANUFACTURING A MAGNETORESISTIVE SENSOR

[75] Inventors: Hardayal S. Gill, Portola Valley; Tsann Lin, Campbell; Ching H. Tsang, Sunnyvale; Albert J. Wallash, Morgan Hill, all of Calif.

[73] Assignee: International Business Machines Corporation, Armonk, N.Y.

[21] Appl. No.: 417,874

[22] Filed: Apr. 6, 1995

Related U.S. Application Data

[62] Division of Ser. No. 290,320, Aug. 15, 1994.

[51] Int. Cl.$^6$ .................................................. B05D 5/12
[52] U.S. Cl. ................................... 427/131; 427/132
[58] Field of Search ................................. 427/128–132; 428/900, 928

[56]           References Cited

U.S. PATENT DOCUMENTS 4,663,685  5/1987  Tsang ............................. 360/113

FOREIGN PATENT DOCUMENTS

0631276A2  5/1994  European Pat. Off. ............. 5/39

OTHER PUBLICATIONS

Ching Tsang, "Magnetics of small magnetoresistive sensors (invited)", J. Appl, Phys. 55(6), pp. 2226–2231 Mar. 15, 1984.

M. J. Carey & A. E. Berkowitz, "Exchange Aristoropy in Coupled Films of $Ni_{81}Fe_{19}$ With NiO and $Co_xNi_{1-x}O$", Appl. Phys. Lett., vol. 60, No. 24, pp. 3060–3062 Jun. 15, 1992.

S. Soeya et al. "Magnetic Properties of NiO/NiFe Exchange Coupled Films", 1991. (no month avail.).

S. Soeya et al., "A Magnetization Mechanism of Exchange–Coupled Double Layered Films", 1992. (No month avail.).

S. Soeya et al., "Magnetic Properties of the Exchange Coupled Permalloy/Low Bs Ferromagnetic/Antiferromagnetic Films", 1992. (No month avail.).

S. Soeya et al., "Magnetic Properties of the Exchange Coupled NiFe/NiO Films", 1993. (No month available).

Primary Examiner—Bernard Pianalto
Attorney, Agent, or Firm—Leslie G. Murray

[57]           ABSTRACT

In a magnetoresistive (MR) read sensor in which the MR layer is transversely biased by a soft magnetic layer separated from the MR layer by a nonmagnetic spacer layer an antiferromagnetic stabilization layer of NiO provides a stabilizing exchange-coupled magnetic field to the transverse bias layer insuring that the transverse bias layer is fully saturated in a preferred direction during sensor operation.

15 Claims, 7 Drawing Sheets

METHOD OF MANUFACTURING A MAGNETORESISTIVE SENSOR

This is a divisional of application Ser. No. 08/290,320, filed on Aug. 15, 1994, entitled "Magnetoresistive Sensor Having Exchange-Coupled Stabilization For Transverse Bias Layer", in the name of H. S. Gill, T. Lin, C. Tsang and A. Wallash.

BACKGROUND OF THE INVENTION

The present invention relates generally to magnetoresistive (MR) read sensors and, more particularly, to an MR read sensor in which an insulating antiferromagnetic film provides an exchange-coupled stabilization field for the transverse bias layer in MR sensor.

A general description of the principles of operation of MR sensors in magnetic recording systems is provided by Tsang in "Magnetics of Small Magnetoresistive Sensors", *Journal of Applied Physics*, Vol. 55(6), Mar. 15, 1984, pp. 2226–2231. Essentially, an MR sensor detects magnetic field signals through the resistance changes of the magnetoresistive read element as a function of the amount and direction of magnetic flux being sensed by the element. MR sensors are of interest for three primary reasons: the voltage output when detecting recorded flux transitions in a magnetic medium is large and proportional to an applied sense current; good linear density resolution can be obtained; and the MR sensor output is independent of the relative velocity between sensor and medium.

It is well known in the prior art that in order for an MR sensor to operate optimally, two bias fields are required. To bias the MR material so that its response to a magnetic field is linear, a transverse bias field is generally provided. This bias field is normal to the plane of the magnetic media and parallel to the surface of the planar MR element. Typically, the transverse bias field is provided by a layer of soft magnetic material deposited adjacent to the MR element and magnetized by a magnetic field generated by a current flow in the MR element, also referred to as "soft adjacent layer" ("SAL") biasing. The transverse bias layer is separated from the MR element by a thin nonmagnetic layer.

The second bias field typically utilized with MR elements is referred to as the longitudinal bias field and extends parallel to the surface of the magnetic media and parallel to the lengthwise direction of the MR element. The primary purpose of the longitudinal bias is to suppress Barkhausen noise which is generated by multi-domain activities within the MR element. A secondary purpose of the longitudinal bias field is to improve the magnetic stability in the presence of high magnetic field excitation. The longitudinal bias field typically is provided by either hard-magnet or exchange-coupling biasing as is well-known in the art.

Figure 2:
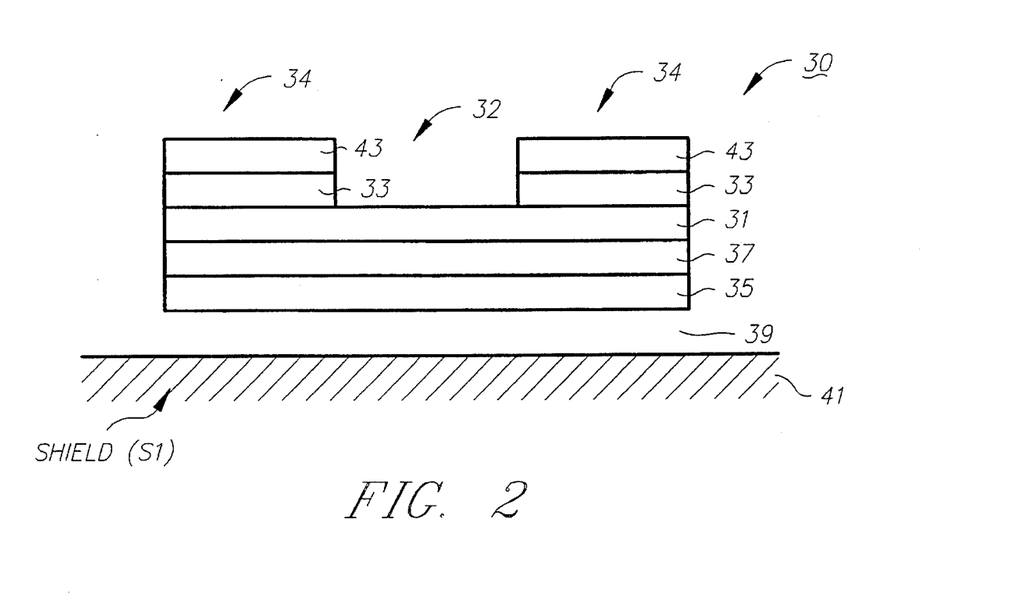
FIG. 2 is a schematic diagram illustrating the construction of a thin film MR sensor according to the prior art.

A prior art MR sensor as shown in FIG. 2 utilizes a magnetically soft adjacent layer as described above to provide the transverse bias field. MR sensors using a SAL for transverse bias often exhibit magnetic instability in the sensor end or tail region and significant side-track reading. For high areal storage density, greater than 1 gigabit per square inch, for example, the height of the MR stripe or element is relatively small, on the order of less than 1 micrometer (um). For element dimensions in this range, it is not possible to fully saturate the soft magnetic layer and therefore it does not provide an adequate transverse bias field to the MR sensor. For certain structural configurations, the unsaturated soft magnetic layer may also cause Barkhausen noise in the sensor. Additionally, for sensor designs using hard bias to provide the longitudinal bias field, the presence of the soft magnetic layer under the hard bias material lowers the strength of its magnetic field and thus makes it ineffective for longitudinal bias. What is needed then, is a method of stabilizing the soft magnetic layer and insuring that it is saturated.

The phenomenon of exchange anisotropy is well-known in the art. It occurs as a result of the interaction of a ferromagnetic material in contact with an antiferromagnetic material, and can be described in terms of an exchange interaction between magnetic moments on each side of the interface between the two materials. For example, exchange coupling between thin layers of ferromagnetic nickel-iron (NiFe) and antiferromagnetic iron-manganese (FeMn) produces a unidirectional anisotropy resulting in a shift of the MH loop in the MR element.

A recently developed nickel oxide (NiO) material which is antiferromagnetic and an insulator provides opportunity to solve some of the above discussed disadvantages of prior art MR sensors. Prior art of interest discussing the use of NiO for exchange coupling includes a paper entitled "Exchange Anisotropy in Coupled Films of $Ni_{81}Fe_{19}$ with NiO and $Co_xNi_{1-x}O$" by Carey et al published at page 3060 et seq. of *Appl. Phys. Lett.* 60, 15 Jun. 1992. Also, various papers by S. Soeya et al entitled "Magnetic Properties of NiO/NiFe Exchange Coupled Films" (1991), "A Magnetization Mechanism of Exchange-Coupled Double Layered Films" (1992), "Magnetic Properties of the Exchange Coupled Permalloy/Low Bs Ferromagnetic/Antiferromagnetic Films" (1992) and "Magnetic Properties of the Exchange Coupled NiFe/NiO Films" (1993) discuss NiO in exchange coupled systems with NiFe.

SUMMARY OF THE INVENTION

It is therefore a primary object of the present invention to provide a magnetoresistive (MR) read sensor having improved transverse biasing characteristics that are stable during sensor operation.

It is a further object of the present invention to provide an MR read sensor having a transverse bias layer that is stabilized by exchange coupling to an antiferromagnetic layer.

In accordance with the principles of the present invention an MR read sensor comprises a central active region separating two passive end regions. The central active region comprises an MR element separated from a soft magnetic transverse bias layer by a nonmagnetic spacer layer. An antiferromagnetic stabilization layer of NiO provide a stabilizing exchange-coupled magnetic field to the transverse bias layer insuring that the transverse bias layer is fully saturated during sensor operation.

According to one preferred embodiment, the MR element, the nonmagnetic spacer, the transverse bias layer and the NiO stabilization layer extend into the sensor passive end region. A longitudinal bias layer of antiferromagnetic material is formed in each passive end region overlaying the MR layer and provides an exchange-coupled longitudinal bias field in the MR sensor. The Néel temperature for the longitudinal bias layer is much higher than the Néel temperature for the NiO stabilization layer. Thus the direction of the longitudinal bias field can be set in a first high temperature anneal process while the direction of the transverse bias stabilization field is set in a second low temperature anneal process.

Alternatively, the MR element, the nonmagnetic spacer layer and the transverse bias layer can extend over the sensor central active region only with each passive end region comprising a hard bias layer abutting the adjacent edge of the MR element. The hard bias layer is of a high coercivity material and provides the sensor longitudinal bias field in a well-known manner. A NiO stabilization layer underlays the transverse bias layer and the hard bias layers extending the length of the MR sensor central active region and the passive end regions.

In an MR sensor, it is important to ensure that the sensor elements are electrically insulated from magnetic shielding elements formed on both sides of the sensor. Since NiO is a good electrical insulating material it also serves to insulate the MR sensor from the first or lower magnetic shield element.

BRIEF DESCRIPTION OF THE DRAWINGS

The foregoing and other objects, features and advantages of the present invention will be apparent from the following detailed description of the preferred embodiments of the invention, reference being made to the accompanying drawings, in which like reference numerals indicate like parts and in which.

DETAILED DESCRIPTION OF THE PREFERRED EMBODIMENTS

Figure 1:
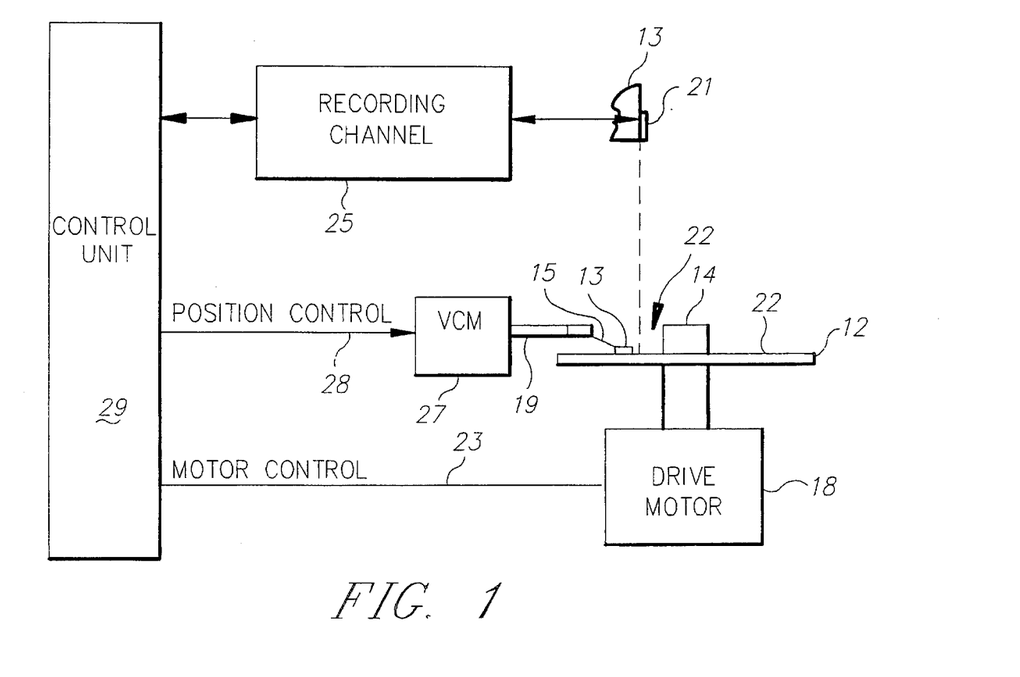
FIG. 1 is a simplified block diagram of a magnetic disk storage system embodying the present invention.

Referring now to FIG. 1, although the invention is described as embodied in a magnetic disk storage system as shown in FIG. 1, it will be apparent that the invention is also applicable to other magnetic recording systems such as a magnetic tape recording system, for example. At least one rotatable magnetic disk 12 is supported on a spindle 14 and rotated by a disk drive motor 18. The magnetic recording media on each disk is in the form of an annular pattern of concentric data tracks (not shown) on disk 12.

At least one slider 13 is positioned on the disk 12, each slider 13 supporting one or more magnetic read/write transducers 21, typically referred to as read/write heads. As the disks rotate, the sliders 13 are moved radially in and out over the disk surface 22 so that the heads 21 may access different portions of the disk where desired data is recorded. Each slider 13 is attached to an actuator arm 19 by means of a suspension 15. The suspension 15 provides a slight spring force which biases the slider 13 against the disk surface 22. Each actuator arm 19 is attached to an actuator means 27. The actuator means as shown in FIG. 1 may be a voice coil motor (VCM), for example. The VCM comprises a coil moveable within a fixed magnetic field, the direction and velocity of the coil movements being controlled by the motor current signals supplied by a controller.

During operation of the disk storage system, the rotation of the disk 12 generates an air bearing between the slider 13 and the disk surface 22 which exerts an upward force on the slider. The air bearing thus counterbalances the slight spring force of the suspension 15 and supports the slider 13 off and slightly above the disk surface by a small, substantially constant spacing during operation.

The various components of the disk storage system are controlled in operation by control signals generated by control unit 29, such as access control signals and internal clock signals. Typically, the control unit 29 comprises logic control circuits, storage means and a microprocessor, for example. The control unit 29 generates control signals to control various system operations such as drive motor control signals on line 23 and head position and seek control signals on line 28. The control signals on line 28 provide the desired current profiles to optimally move and position a selected slider 13 to the desired data track on the associated disk 12. Read and write signals are communicated to and from read/write heads 21 by means of recording channel 25.

The above description of a typical magnetic disk storage system, and the accompanying illustration of FIG. 1 are for representation purposes only. It should be apparent that disk storage systems may contain a large number of disks and actuators, and each actuator may support a number of sliders.

Figure 4:
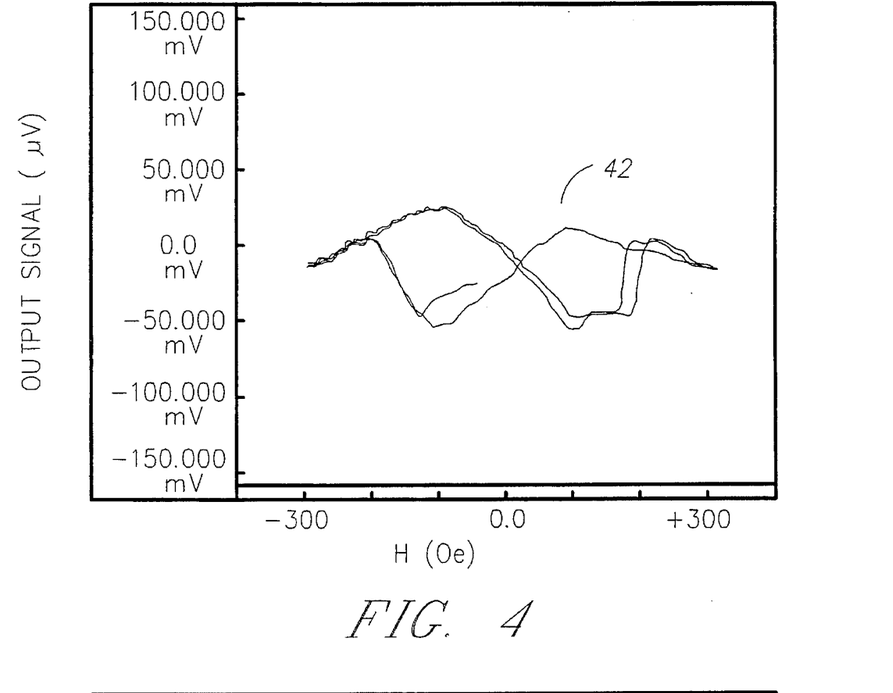
FIG. 4 is a graph illustrating the output signal of a prior art thin film MR sensor.

Referring now also to FIGS. 2 and 4, a prior art thin film MR sensor, as described in U.S. Pat. No. 4,663,685, for example, is shown. The MR sensor 30 is divided into a central active region 32 where the actual sensing of a magnetic data signal is accomplished and is bounded by passive end regions 34. As discussed hereinabove, the active region is biased with a transverse bias field while the passive end regions are biased by a longitudinal bias field. MR sensor 30 comprises transverse bias layer 35, a spacer layer 37, an MR layer 31 and a longitudinal bias layer 33. The MR layer 31 which is formed of a ferromagnetic material such as $Ni_{81}Fe_{19}$, for example, is attached to electrical lead conductors 43 and provides an output current. The lead conductors 43 provide electrical connection to external sensing circuits in the recording channel 25 to determine resistance changes in the MR layer 31.

The longitudinal bias layer 33 is formed over the end regions of the MR layer 31 and is of an antiferromagnetic material such as nickel-manganese (NiMn) or manganese-iron (MnFe), for example. The longitudinal bias layer 33 provides a magnetic bias field along the longitudinal axis of the MR layer 31 to assure that the MR layer 31 is maintained in a single magnetic domain state. The existence of a single magnetic domain state in the MR layer is essential to suppress Barkhausen noise which is associated with MR materials which exhibit multiple magnetic domain states. As is well known in the art, a portion of the MR sensor bias current flows through the transverse bias layer 35 to provide a magnetic field oriented generally perpendicular to the medium 22, which, in cooperation with the bias layer demagnetizing field, biases the magnetization of the MR layer 31 in a direction non-parallel to the medium 22. This transverse bias field maintains the MR layer 31 in a linear response mode such that the current output is essentially a linear function of the resistance changes. The traverse bias layer 35 is formed of a soft magnetic material such as nickel-iron-niobium (NiFeNb), nickel-iron-rhodium (NiFeRh) or nickel-iron-chromium (NiFeCr), for example, and is magnetostatically coupled to the MR layer. The spacer layer 37 is of a nonmagnetic material, such as tantalum (Ta), for example, and magnetically isolates the MR layer 31 from the transverse layer 35 to minimize or prevent any magnetic exchange coupling between the layers.

The MR head 30 is on a substrate which includes magnetic shield layer 41 and is electrically isolated from the shield layer by a layer of insulating or dielectric material, such as aluminum oxide ($Al_2O_3$), also referred to as alumina. For the purposes of illustration, on the first or lower shield, S1, is shown. As is known in the art, the MR sensor 30 is typically disposed between a pair of magnetic shields, S1 and S2. The first shield layer 41 is formed of a soft magnetic material having a high physical hardness, such as an aluminum-silicon-iron material (AlSiFe) referred to as Sendust.

The continuous spacer MR sensor, i.e., the spacer layer 37 across the entire length of the sensor being in contact with the MR layer 31 in both the active and passive regions, provides the advantages of simplicity in geometry and ease in fabrication. A potentially significant problem with the soft magnetic transverse bias layer is magnetic instability in the soft magnetic layer. FIG. 4 is a low current transfer curve 42 for an MR sensor having a transverse bias layer 35 of NiFeNb with a current of 0.5 mA and a magnetic drive field (i.e., magnetic signal) of +/− 300 Oe. The transfer curve 42 clearly shows that the MR sensor is switching between two magnetic states. This behavior has been shown to result in sensor output signal amplitude instability at nominal operating bias currents. The problem of transverse layer magnetic instability can be solved in a straight forward manner by biasing the entire soft magnetic layer 35 parallel to the direction of the transverse magnetic field produced by the layer by exchange-coupling with an adjacent layer of antiferromagnetic material below the soft magnetic layer.

Referring now also to FIGS. 3, 5A, 5B, 5C and 6, a thin film MR sensor according to the principles of the present invention is shown. The MR sensor 40 comprises a transverse bias layer 47 and an MR layer 51 separated by a nonmagnetic spacer layer 49 formed on a substrate 45 of suitable material. The transverse bias layer 47 is formed by vacuum deposition techniques over a layer of antiferromagnetic material to provide an antiferromagnetic layer 57 adjacent to and in contact with the lower side of the transverse layer 47. A nonmagnetic electrically insulating layer 59 and a first magnetic shield layer 61 are formed between the antiferromagnetic layer 57 and the substrate 45. Longitudinal bias layer 53 is formed over the passive end regions 54 of the MR sensor and in contact with the MR layer 51. Electrical lead conductors 55 connect the MR sensor to a bias current source 65 and signal sensing and other circuitry 63 in the recording channel.

Figure 3:
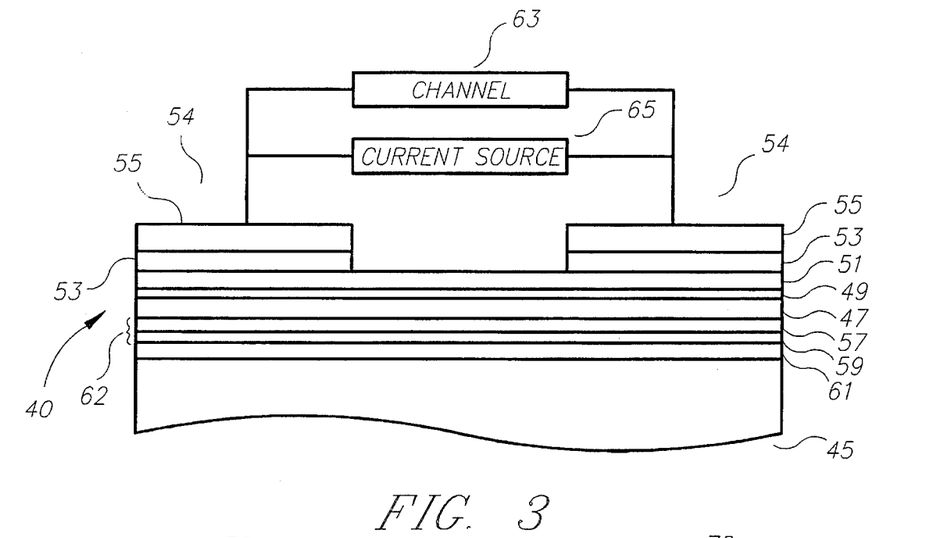
FIG. 3 is a schematic diagram illustrating the construction of a thin film MR sensor according to the present invention.

The use of an antiferromagnetic layer 57 to provide a stabilizing bias field for the transverse bias layer 47 raises several important considerations. Firstly, the antiferromagnetic layer 57 must not provide a significant shunt path for the MR sensor bias current. Loss of bias current from the MR layer in the central active region 56 can result in significant reduction of the sensor signal-to-noise ratio and degradation of the sensor sensitivity thus rendering the sensor unusable. This issue becomes especially important as the thicknesses of the MR sensor layers are continually scaled downwards as the demand for higher and higher recording densities increases, making the sensors more and more susceptible to electrical shunting effects from the antiferromagnetic layer 57 which must be of a specified minimum thickness to preserve its magnetic order. Secondly, if the longitudinal bias layer 53 is also a antiferromagnetic material, the two antiferromagnetic materials used in the layers must be substantially different from each other. In particular, the Néel temperatures of the two materials must be substantially different to allow the exchange bias directions of the two exchange-coupled systems to be set perpendicular to each other by annealing at first a high temperature and then at a second, lower temperature.

For example, consider the MR sensor 40 shown in FIG. 3 having a continuous spacer layer 49 and a antiferromagnetic longitudinal bias layer 53 of NiMn in the end or tail regions 54 of the sensor. In this example, the use of another layer 57 of antiferromagnetic NiMn for the transverse bias layer stabilization would create difficulties in setting the two exchange-bias field directions perpendicular to each other, since both the longitudinal bias layer and the transverse stabilization exchange-coupled systems would have essentially the same Néel temperature. In addition, electrical shunting effects from the NiMn stabilization layer 57 would be serious for thin MR sensors. For example, in an MR sensor with a 90 Angstrom (A) thick MR layer 51 of nickel-iron (NiFe) and the transverse bias layer stabilized by an approximately 250 A thick NiMn layer, since the NiFe and the NiMn layers are about 25 uohm-cm and 150 uohm-cm, respectively, the 250 A NiMn layer is equivalent to a 42 A NiFe layer in shunting effects, resulting in at least a 35 percent signal reduction. Use of an approximately 150 A thick MnFe layer instead of the NiMn layer for the transverse bias layer stabilization will reduce the shunting effects and allow separate exchange-bias initialization due to the much lower Néel temperature of the MnFe compared to the NiMn. However, FeMn is known to exhibit corrosion and reliability problems when used in the central active region 56 of MR sensors.

The antiferromagnetic metal alloys do not appear to be suitable for use as transverse bias layer stabilization material. Thus, the ideal candidate is a dielectric antiferromagnetic material that exhibits strong exchange-coupling with the typical soft magnetic materials and has a relatively low Néel temperature. Nickel oxide (NiO) is an antiferromagnetic and dielectric material having good insulating properties and has been shown to exhibit significant exchange-coupling in a NiFe system.

Figure 5A:
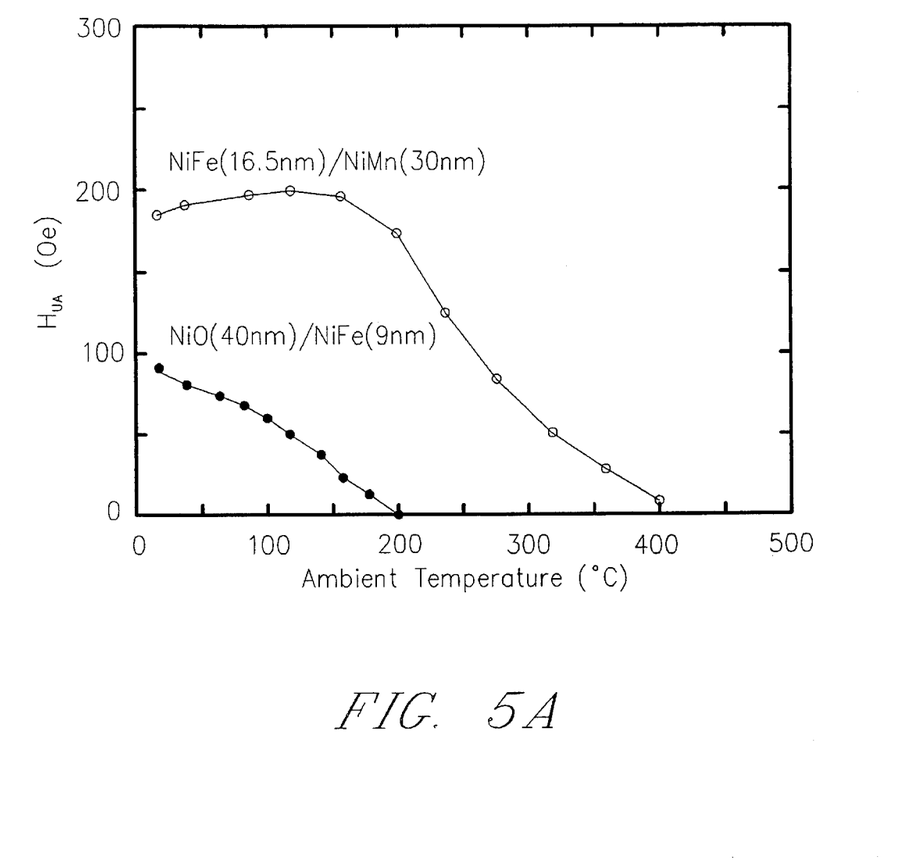
FIG. 5A is a graph illustrating and comparing the temperature dependency of exchange-coupled fields for NiO/NiFe and NiFe/NiMn systems.

Nickel oxide was deposited using R.F. magnetron sputtering techniques from a single target, and its exchange-coupling behavior with layers of various magnetic materials deposited on top of the NiO layer were systematically investigated and optimized. The results show that NiO as thin as 400 A exhibit strong exchange coupling to provide bias fields of 90 Oe, 64 Oe and 50 Oe, respectively, with thin layers of NiFe (90 A), NiFeRh (100 A) and NiFeNb (80 A) on top of the NiO layer. Electrical studies show that the NiO layers are roughly equivalent to alumina in their insulation properties and that the use of NiO in the gap between the first magnetic shield S1 and the transverse bias layer will not degrade sensor performance. As shown in FIG. 5A, the NiFe/NiMn and the NiO/NiFe exchange-coupled systems exhibit significantly different blocking temperatures (i.e., that temperature at which the exchange-coupled field goes to zero) and Néel temperatures that allow the establishment of a perpendicular exchange bias arrangement for MR sensors as described above.

Figure 5B:
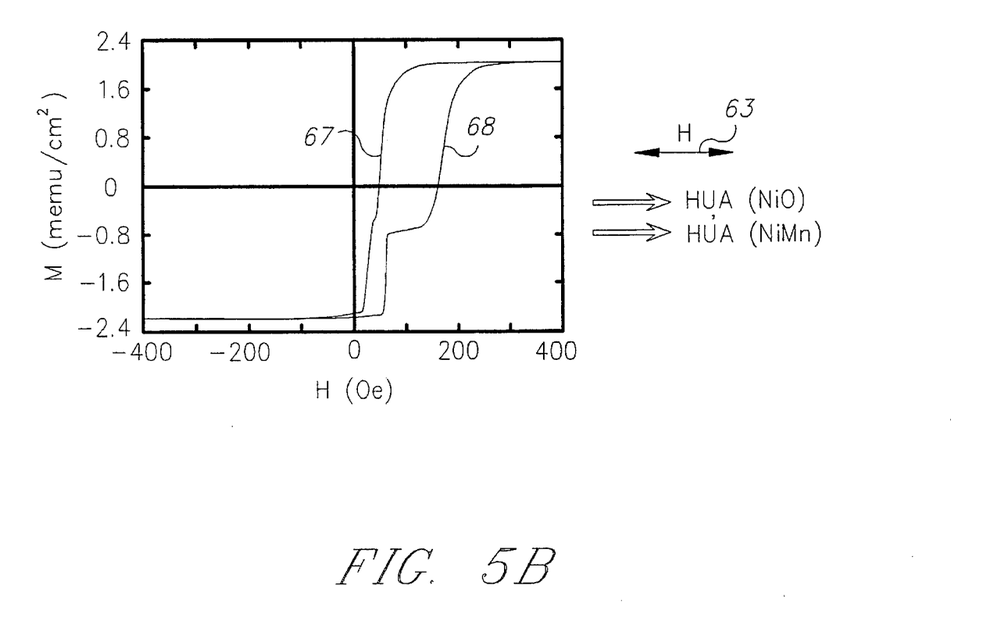
FIGS. 5B and 5C are graphs illustrating the MH loops for a NiO/NiFeNb/Ta/NiFe/NiMn film in a magnetic field applied in the direction of the NiO layer easy axis before and after the exchange-coupled field for the NiO layer is set.
Figure 5C:
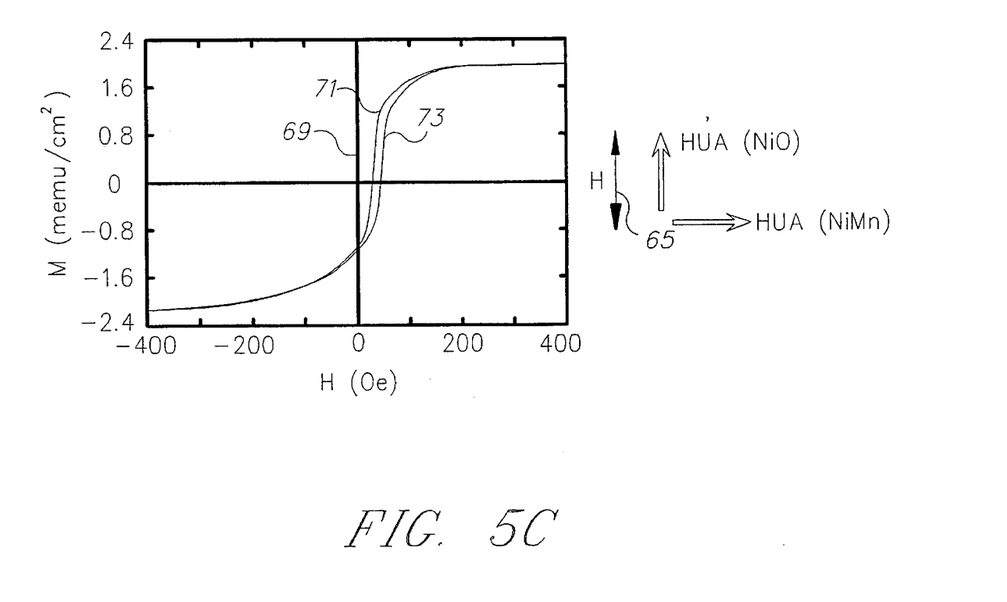

FIGS. 5B and 5C illustrate the MH loops for a NiO/NiFeNb/Ta/NiFe/NiMn (top) film which represent the magnetic layers in the tail or end region of a continuous spacer MR sensor (as shown in FIG. 3) and demonstrate the viability of the NiO/NiMn exchange bias arrangement for such a sensor. FIG. 5B illustrates the easy-axis MH loop 67 for the sensor wherein the exchange-coupled bias fields, $H_{UA}$ and $H'_{UA}$, respectively, of both the NiMn layer 53 and the NiO layer 57 are oriented along the same direction by a 240 degree C. anneal for 10 hours in an externally applied aligning magnetic field. The easy-axis (as indicated by arrow 63) MH loop 67 exhibits two distinctly shifted components, with the more shifted component 68 corresponding to the stronger NiFe/NiMn exchange bias field. FIG. 5C illustrates the MH loop 69 for field excitations along the transverse signal direction (as indicated by arrow 65) where the exchange-coupled bias field, $H'_{UA}$, of the Nio/NiFeNb system is now oriented perpendicular to that of the NiFe/NiMn system, $H_{UA}$, by a short 180 degree C. anneal in an aligning magnetic field rotated 90 degrees. The MH loop 69 clearly exhibits an unshifted hard-axis loop 71 for the NiFe/NiMn system and a shifted easy-axis loop 73 for the NiO/NiFeNb system. This behavior demonstrates proper exchange-coupled bias field orientations for the operation of the dual exchange-biased MR sensor.

Figure 6:
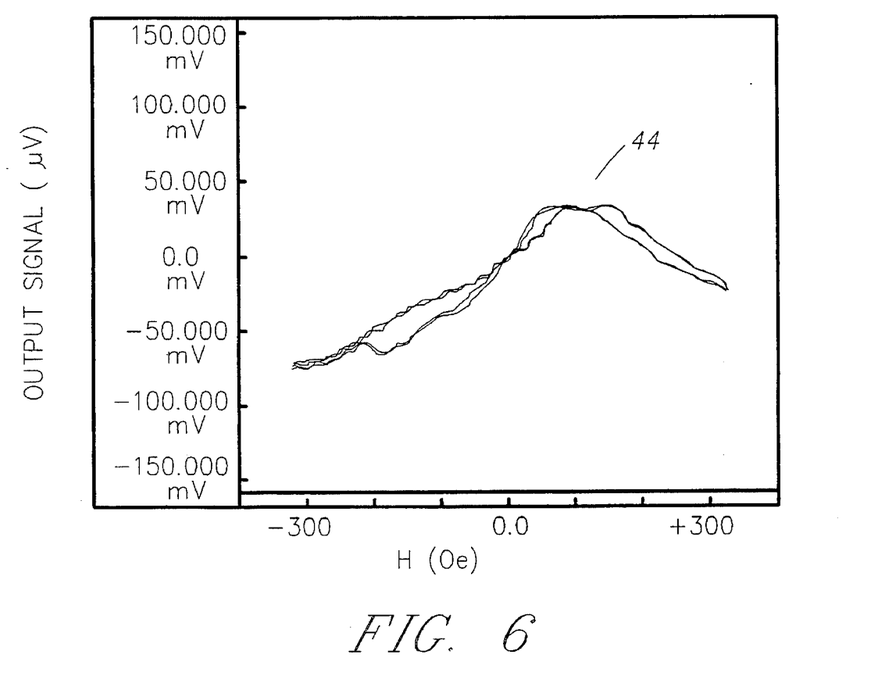
FIG. 6 is a graph illustrating the output signal of the thin film MR sensor shown in FIG. 3.

FIG. 6 is a low current transfer curve 44 for an MR sensor having a transverse bias layer 47 of NiFeNb deposited over and in physical contact with an antiferromagnetic layer of NiO to maintain or pin the magnetic field in the transverse bias layer in the direction of the desired transverse bias field. For a sensor bias current of 0.5 mA and a magnetic drive field (i.e., magnetic signal) of +/− 300 Oe, the transfer curve 44 shows that the MR sensor is stable and remains in a single magnetic state.

Figure 7:
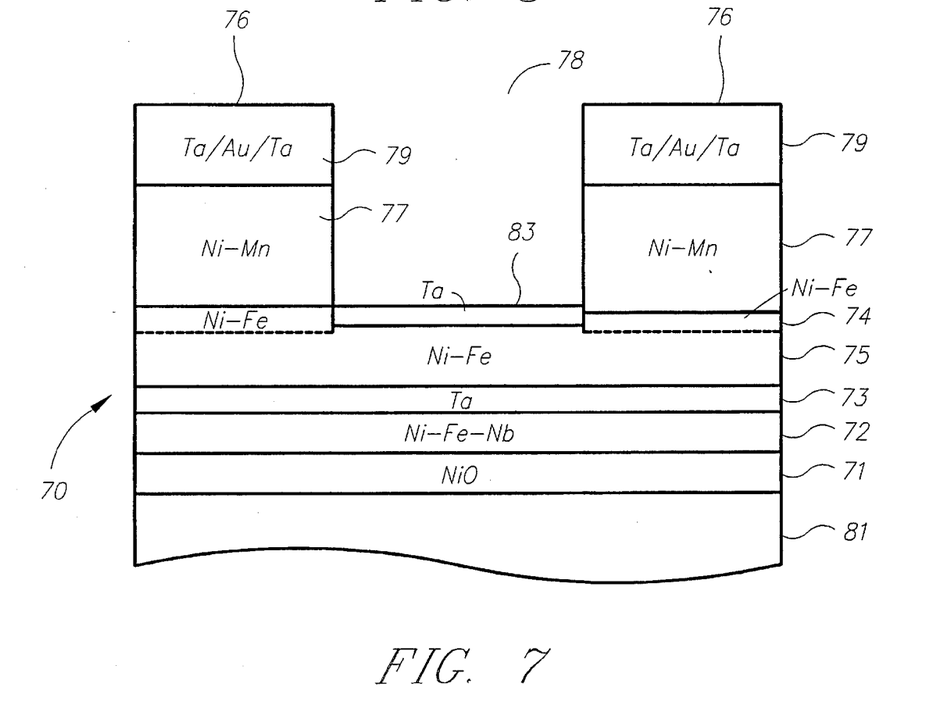
FIG. 7 is a schematic diagram illustrating another embodiment of the thin film MR sensor shown in FIG. 3.

Referring now to FIG. 7, a preferred embodiment of an exchange-coupled stabilized transverse bias layer MR sensor according to the present invention is shown. An MR sensor 70 comprises an antiferromagnetic stabilization layer 71 of NiO, a transverse bias layer 72 of NiFeNb, a spacer layer of Ta and an MR layer of NiFe deposited on a suitable substrate 81. A longitudinal bias layer of NiMn is deposited in the passive end or tail regions 76 of the sensor to provide a longitudinal bias field in the MR layer 75 by exchange coupling between the NiMn and the NiFe layers. Conductive leads 79 of a suitable low resistivity material are formed in the end regions over the longitudinal bias layer to provide electrical connection between the MR sensor and external circuitry. In the preferred embodiment, the conductive lead 79 is a layered structure including a primary conductor of gold (Au) with an overlayer and underlayer of Ta. Additionally, the MR layer 75 is capped with a thin layer 83 of Ta in the sensor's central active region 78.

The NiO/NiMn dual exchange-coupled biased MR sensor 70 is fabricated using R.F. or DC sputtering techniques. First a suitable substrate 81 including a first magnetic shield layer of Sendust covered with a layer of insulating material, such as alumina, for example, is prepared. Then the sensor active region layer structure NiO/NiFeNb/Ta/NiFe/Ta is deposited sequentially. Next, the sensor end region 76 is defined by photolithography and subtractively processed, such as by ion milling or etching, for example, to remove the thin Ta cap layer to expose the NiFe MR layer at the end regions. The longitudinal bias layer 77 is deposited in the sensor end regions 76 in physical contact with the MR layer 75 over a thin seed layer of 74 of NiFe followed by the conductor lead structure of Ta/Au/Ta or other suitable lead material. Finally, the shape of the MR sensor in the central active region is defined by a second photolithographic patterning process followed by a subtractive removal process. The central active region 78 of the sensor is defined by the spaced-apart inner boundaries of the longitudinal bias and lead layers. This is a critical dimension as the length of the central active region determines the read trackwidth. An advantage of waiting until the leads have been deposited prior to defining the MR sensor shape is that the material forming the gap between the transverse bias layer 72 is protected from sensor fabrication process steps and damage due to over etching of the gap layer (i.e., the combined NiO stabilization layer 71 and the alumina layer over the first magnetic shield) is minimized.

In a preferred embodiment, the NiFeNb transverse bias layer 72 is about 100 A thick, the Ta spacer layer 73 is about 60 A thick, the NiFe MR layer 75 is about 150 A thick and the Ta capping layer 83 is about 30 A thick. The NiMn longitudinal bias layer 77, including a seed layer 74 of NiFe, for example, is about 350 A thick and the conductive lead structure is about 350 A thick. As discussed above, NiO is a dielectric material which exhibits about the same insulating properties as an equal thickness of alumina. Therefore, the NiO stabilization layer 71 both provides bias field stabilization to the transverse bias layer 72 and electrically insulates the MR sensor from the magnetic shield element. While the entire thickness of the insulative gap between the MR sensor and the magnetic shield element could be of NiO (gap 62 as shown in FIG. 3), the thickness of the NiO stabilization is defined by the strength of the exchange-coupled field required and typically will be less than the total required gap thickness. In this preferred embodiment, the gap thickness is approximately 1200 A consisting of the NiO stabilization layer 71 with a thickness of about 400 A and a layer of alumina of about 800 A.

Figure 8:
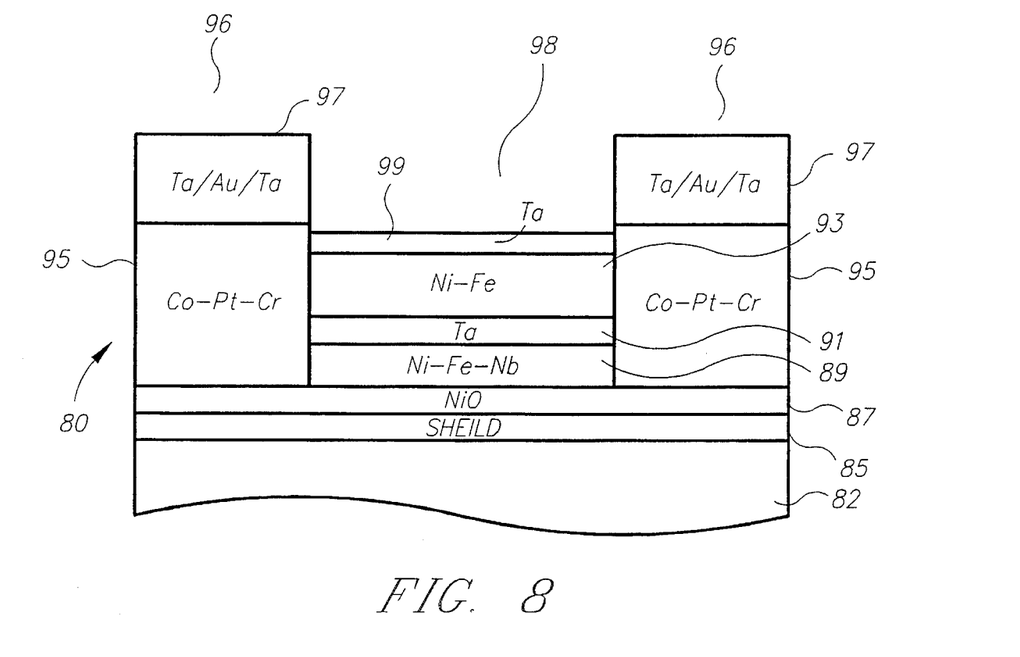
FIG. 8 is a schematic diagram illustrating another embodiment of the thin film MR sensor shown in FIG. 3.
Figure 9:
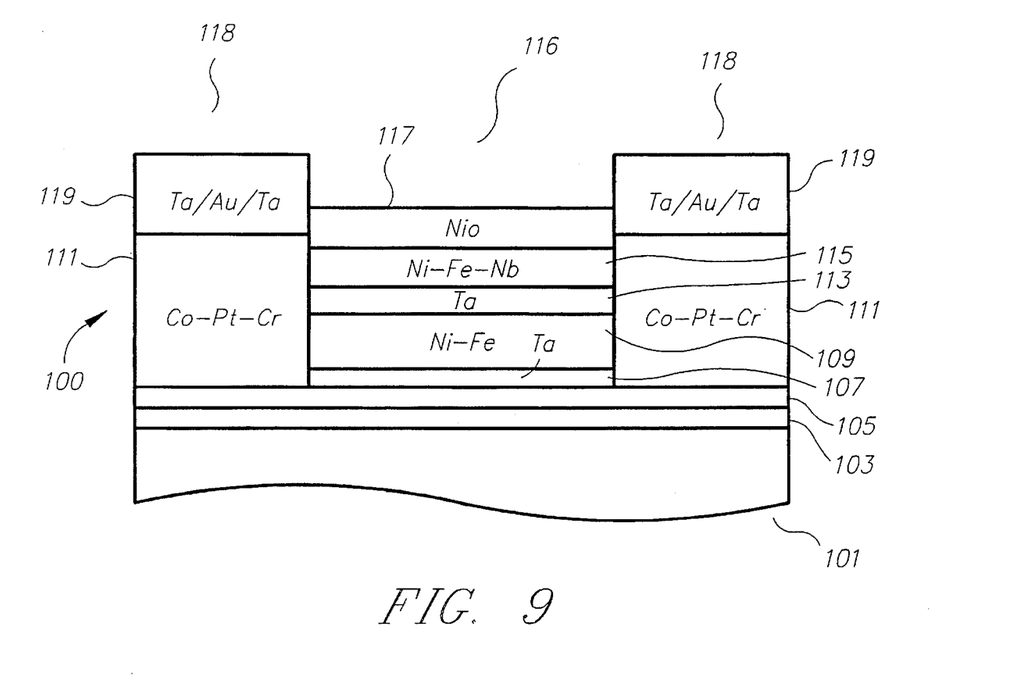
FIG. 9 is a schematic diagram illustrating another embodiment of the thin film MR sensor shown in FIG. 3.

Referring now to FIGS. 8 and 9, two additional preferred embodiments of the exchange-coupled stabilized transverse bias layer MR sensor of the present invention are shown. The MR sensor 80 shown in FIG. 8 comprises a magnetic shield layer 85 of Sendust or other suitable magnetic material formed on a suitable substrate, an insulation/stabilization layer 87 of NiO, a transverse bias layer 89 of NiFeNb, a spacer layer 91 of Ta, an MR layer 93 of NiFe and a capping layer 99 of Ta. Utilizing photolithographic and subtractive processing, the NiFeNb/Ta/NiFe/Ta layer stack is patterned to define the sensor central active region 98 and expose the surface of the NiO layer 87 in the sensor end regions 96. The longitudinal bias layer 95 followed by the conductive lead layer 97 are then deposited and patterned. In this embodiment, as is known in the art, the longitudinal bias field is provided by a hard magnetic material, such as cobalt-platinum-chromium (CoPtCr), cobalt-nickel-chromium (CoNiCr), cobalt-chromium (CoCr), for example, or other suitable high coercivity material. The conductive lead structure 97 is primarily Au with a Ta overlayer and underlayer, but may be of any suitable low resistivity conductive material. The magnetic field direction of the hard magnetic bias layer 95 is set to be parallel to the longitudinal axis of the MR layer 93 by saturating the layer with an externally applied magnetic field. The direction of the exchange-coupled field between the NiO stabilization layer 87 and the transverse bias layer 89 is set by a low-temperature anneal process in the presence of an externally applied magnetic field.

The MR sensor 100 shown in FIG. 9 is also a "hard-biased" sensor similar to the MR sensor 80 described above with reference to FIG. 8 with the order of the sensor layers in the central active region 116 being reversed. The MR sensor 100 comprises a suitable substrate 101 including a magnetic shield layer 103 and an insulating layer 105 of a suitable dielectric material, a thin isolation layer 107 of Ta, an MR layer 109 of NiFe, a spacer layer 113 of Ta, a transverse bias layer 115 of NiFeNb and an antiferromagnetic stabilization layer 117 of NiO. Utilizing photolithographic and subtractive processing, the Ta/NiFe/Ta/NiFeNb/NiO layer stack is patterned to define the sensor central active region 116 and expose the surface of the insulation layer 105 in the sensor end regions 118. The longitudinal bias layer 111 followed by the conductive lead layer 119 are then deposited and patterned in the sensor end regions 118. As described above with reference to FIG. 8, the longitudinal bias field is provided by hard or permanent magnetic biasing with the directions of the longitudinal and transverse bias fields being set by magnetic saturation and low temperature annealing processes, respectively, as described above.

As described above with reference to FIGS. 3 and 6, the use of an antiferromagnetic NiO stabilization layer in combination with a NiFeNb transverse bias layer minimizes or eliminates the magnetic instability exhibited by prior art MR heads as shown in FIG. 4. A potential problem that arises is that if the exchange coupling between the NiO layer and the NiFeNb layer is lost or reduced for some reason, then the NiFeNb soft layer may revert to the unstable magnetic behavior. It has been shown that sensor current transients due to electrical overstress or electrostatic discharge during sensor fabrication and assembly cause a temporary temperature increase in the sensor which raises the temperature of the NiO layer above its blocking temperature resulting in loss or reduction of the exchange-coupled stabilizing field. The loss of the stabilizing field can occur without any physical damage or other effect to the MR sensor because the blocking temperature of the NiO, approximately 180–200 degrees C., is much less than the melting temperature of the MR sensor itself, approximately 1400 degrees C.

Figure 10:
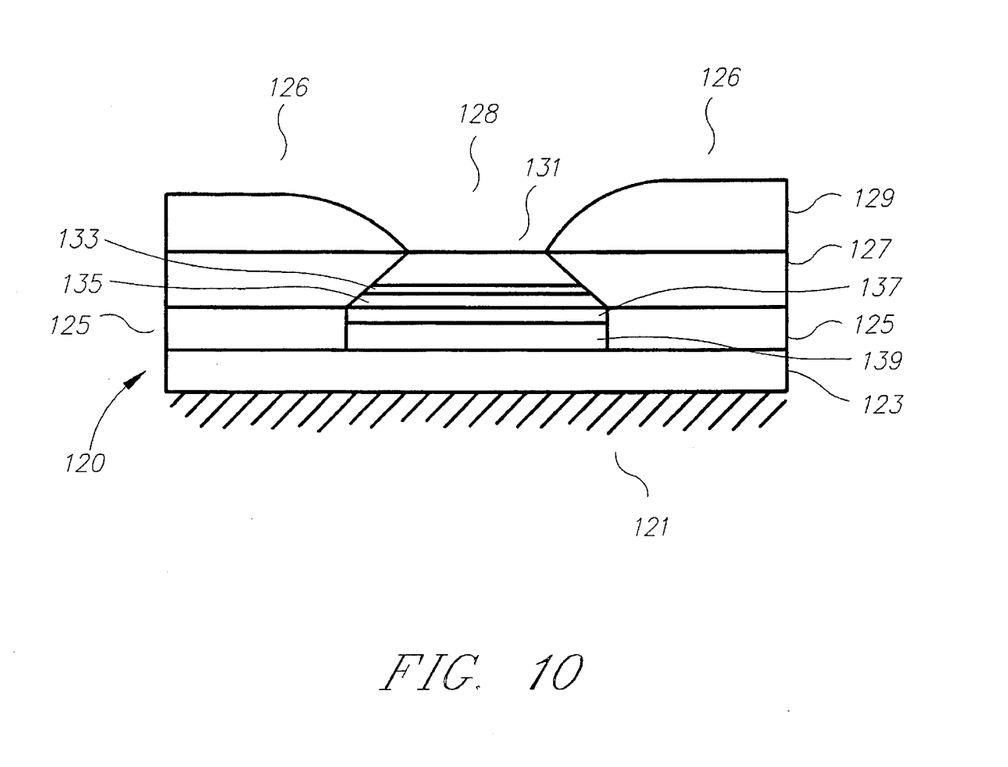
FIG. 10 is a schematic diagram illustrating another embodiment of the thin film MR sensor shown in FIG. 3.

Referring now also to FIG. 10, another preferred embodiment of the exchange-coupled stabilized transverse bias layer MR sensor of the present invention which overcomes the temperature instability problem discussed above is shown. Basically, the MR sensor 120 is temperature stabilized by providing a heat sink for the NiO stabilization layer 137 thus increasing the sensor current value at which the NiO layer reaches its blocking temperature. The structure of the MR sensor 120 is similar to the structure of MR sensor 80 described with reference to FIG. 8. MR sensor 120 comprises an MR layer 131 of NiFe, a spacer layer 133 of Ta and a transverse layer 135 of NiFeNb stabilized by exchange coupling to a stabilization layer 137 of NiO in the central active region 128 of the sensor. Longitudinal biasing of the sensor is provided by hard bias layer 127 of CoPtCr, for example, formed in the sensor end region 126. Conductive leads 129 of Ta or other suitable conductive material are provided in the sensor end region 126 deposited over the hard bias layer 127. The sensor is deposited on a suitable substrate 121 including magnetic shield layer 123. A heat sink layer 139 in contact with the NiO stabilization layer 137 separates the NiO layer from the magnetic shield 123. As shown in FIG. 10, in this preferred embodiment the NiO stabilization layer 137 and the heat sink layer 139 are patterned to be in the sensor central active region 128 only. An insulating layer 125 of dielectric material, such as alumina, for example, forms the gap region between the sensor end region 126 and the magnetic shield layer 123. Alternatively, the NiO stabilization layer 137 and the heat sink layer 139 can extend the entire length of the sensor being formed in both the sensor end region 126 and the central active region 128. Any suitable material having a relatively high thermal conductivity may be used for the heat sink 139 material. Since the NiO layer is an insulating dielectric, the heat sink material may be electrically conductive. Preferably, the heat sink 139 material is a hard metal film such as Ta, for example, or other metal having a greater thermal conductivity than the gap material separating the NiO layer 137 from the magnetic shield layer 123.

While the present invention has been particularly shown and described with reference to preferred embodiments thereof, it will be understood by those skilled in the art that various changes in form and detail may be made therein without departing from the spirit, scope and teaching of the invention. Accordingly, the invention herein disclosed is to be considered merely as illustrative and limited in scope only as specified in the appended claims.

We claim:

1. A method or fabricating a magnetoresistive sensor of the type having a transverse bias layer of ferromagnetic material separated from a magnetoresistive layer by a nonmagnetic spacer layer, said transverse bias layer for providing a transverse bias magnetic field in said magnetoresistive layer, and a longitudinal bias layer of an antiferromagnetic material formed in direct contact with said magnetoresistive layer for providing an exchange-coupled longitudinal bias field in said magnetoresistive layer, wherein a stabilization layer of an antiferromagnetic material is in direct contact with said transverse bias layer for inducing an exchange-coupled magnetic field in said transverse bias layer, said method comprising the steps of:

depositing a stabilization layer of a first antiferromagnetic material on a substrate;

depositing a transverse bias layer of a ferromagnetic material over and in contact with said stabilization layer;

depositing a spacer layer of a nonmagnetic material over said transverse bias layer;

depositing a layer of magnetoresistive material over said spacer layer, said magnetoresistive layer separated from said transverse bias layer by said spacer layer;

depositing a longitudinal bias layer of a second antiferromagnetic material over said magnetoresistive layer and in direct contact with said magnetoresistive layer, said first and second antiferromagnetic materials having different Néel temperatures;

annealing said magnetoresistive sensor at a temperature approximately equal to the higher of the Néel temperatures of said first and second antiferromagnetic materials in the presence of a magnetic field having a desired direction for setting the direction of the exchange-coupled magnetic field induced by the first or second antiferromagnetic material associated with the higher of the two Néel temperatures; and annealing said magnetoresistive sensor at a temperature approximately equal to the lower of the Néel temperatures of said first and second antiferromagnetic materials in the presence of a magnetic field having a desired direction for setting the direction of the exchange-coupled magnetic field induced by the first or second antiferromagnetic material associated with the lower of the two Néel temperatures.

2. The method of claim 1 wherein said first antiferromagnetic material has a lower Néel temperature than said second antiferromagnetic material.

3. The method of claim 2 wherein said first antiferromagnetic material comprises nickel oxide and said second antiferromagnetic material is an alloy of manganese.

4. The method of claim 3 wherein said second antiferromagnetic material is selected from the group consisting of nickel-manganese and manganese-iron.

5. The method of claim 1 further comprising the additional step of first depositing a heat sink layer on said substrate, said stabilization layer being deposited over and in contact with said heat sink layer.

6. The method of claim 5 wherein said head sink layer comprises tantalum.

7. The method of claim 1 wherein said first antiferromagnetic material comprises a dielectric antiferromagnetic material having a low Néel temperature when compared to the Néel temperature of said second antiferromagnetic material.

8. A method for fabricating a magnetoresistive sensor of the type having a transverse bias layer of ferromagnetic material separated from magnetoresistive layer by a nonmagnetic spacer layer formed in a central region of said magnetoresistive sensor, said transverse bias layer for providing a transverse bias magnetic field in said magnetoresistive layer, and a longitudinal bias layer of a high coercivity material formed in end regions of said magnetoresistive sensor, said end regions separated by said central region, said longitudinal bias layer for providing a longitudinal bias field in said magnetoresistive layer, wherein a stabilization layer of an antiferromagnetic material is in direct contact with said transverse bias layer for inducing an exchange-coupled magnetic field in said transverse bias layer, said method comprising the steps of:

depositing a stabilization layer of an antiferromagnetic material on a substrate;

depositing a transverse bias layer of a ferromagnetic material over and in contact with said stabilization layer;

depositing a spacer layer of a nonmagnetic material over said transverse bias layer;

depositing a layer of magnetoresistive material over said spacer layer, said magnetoresistive layer separated from said transverse bias layer by said spacer layer;

patterning said transverse bias layer, said spacer layer and said magnetoresistive layer to extend over only said central region;

depositing a longitudinal bias layer of a high coercivity material in said end regions of said magnetoresistive sensor for providing a longitudinal bias field in said magnetoresistive layer;

saturating said longitudinal bias layer with an externally applied magnetic field having a desired direction with respect to the longitudinal axis of said magnetoresistive layer for setting the magnetic field direction of said longitudinal bias layer; and annealing said magnetoresistive sensor at a temperature approximately equal to the Néel temperature of antiferromagnetic material in the presence of a magnetic field having a desired direction for setting the direction of the exchange-coupled magnetic field induced in the transverse bias layer by said stabilization layer.

9. The method of claim 8 wherein said antiferromagnetic material comprises a dielectric antiferromagnetic material.

10. The method of claim 8 wherein said antiferromagnetic material comprises nickel-oxide.

11. The method of claim 8 wherein said high coercivity material is selected from the group consisting of cobalt-platinum-chromium, cobalt-nickel-chromium and cobalt-chromium.

12. The method of claim 8 wherein said transverse bias layer comprises a material selected from the group consisting of nickel-iron-niobium, nickel-iron-rhodium and nickel-iron-chromium.

13. The method of claim 8 wherein said stabilization layer extends over said end regions and said central region of said magnetoresistive sensor, said longitudinal bias layer being deposited on said stabilization layer in said end regions of said magnetoresistive sensor.

14. The method of claim 8 further comprising the additional steps of first depositing a heat sink layer on said substrate, said stabilization layer being deposited over and in contact with said heat sink layer.

15. The method of claim 14 wherein said head sink layer comprises tantalum.

* * * * *